Dec. 19, 1961   R. P. FERRY ET AL   3,013,480
INDICATING MECHANISM FOR PHOTOGRAPHIC CAMERAS
Filed Sept. 21, 1959   2 Sheets-Sheet 1
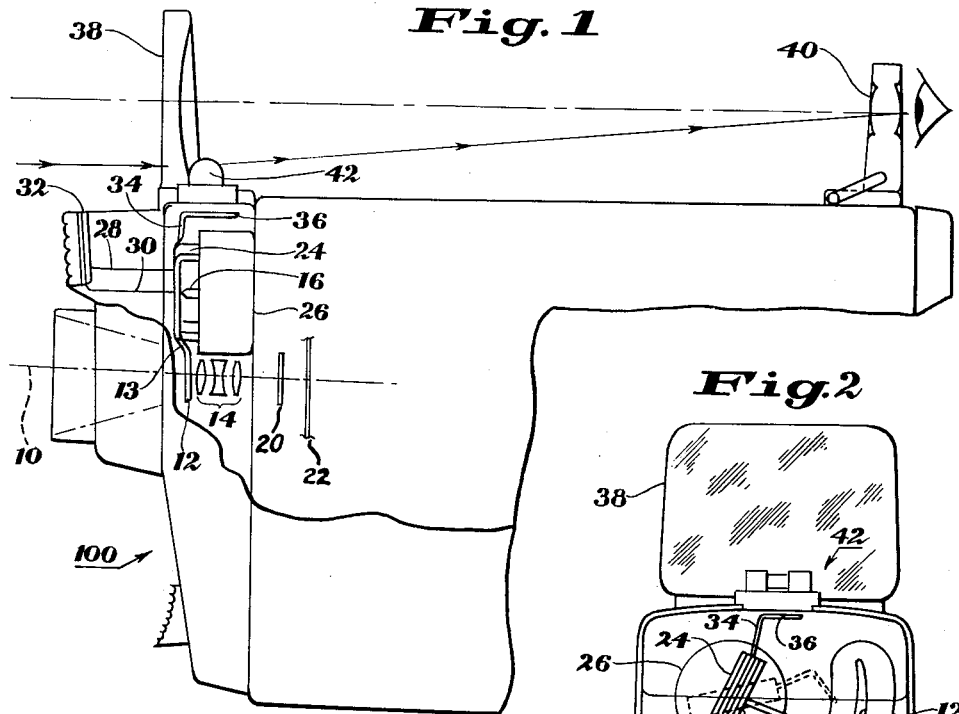
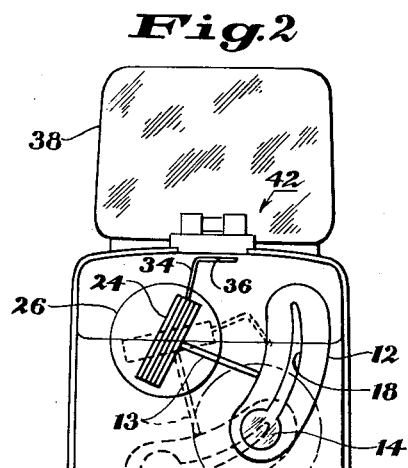
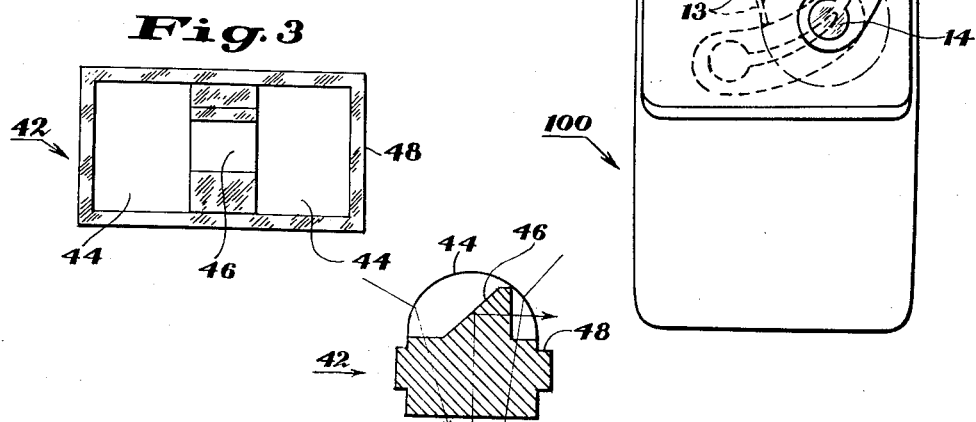
Richard P. Ferry
Fred N. Woodhouse
INVENTORS
BY R. Frank Smith
Robert W. Hampton
ATTORNEYS

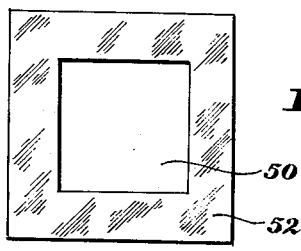
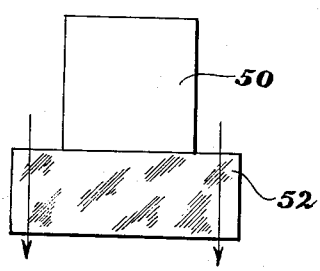
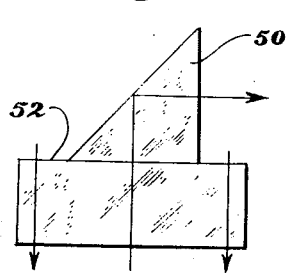
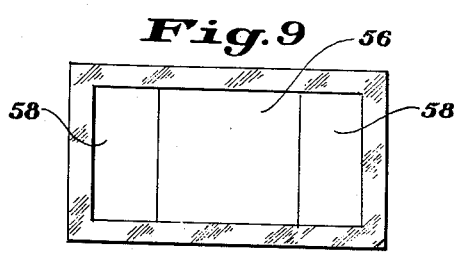
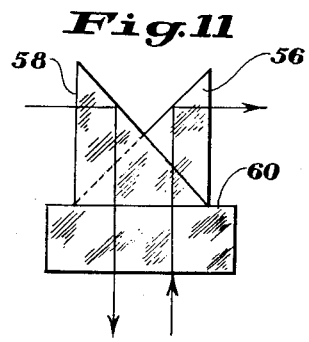
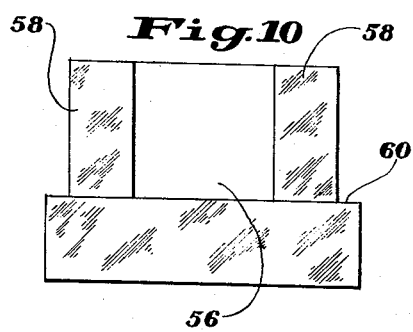

United States Patent Office 3,013,480
Patented Dec. 19, 1961

3,013,480
INDICATING MECHANISM FOR PHOTOGRAPHIC CAMERAS
Richard P. Ferry and Fred N. Woodhouse, Rochester, N.Y., assignors to Eastman Kodak Company, Rochester, N.Y., a corporation of New Jersey
Filed Sept. 21, 1959, Ser. No. 841,375
4 Claims. (Cl. 95—10)

The present invention relates to photographic cameras having automatic exposure control systems, and more particularly relates to means for indicating low scene brightness in such cameras.

It is convenient for the operator of a still or motion picture camera, which has an automatic exposure control system, to be warned when scene brightness falls below the range for which the camera is designed. Numerous devices have been proposed for presenting a low-light signal in the viewfinder of the camera in such cases. However, devices of this type generally have required the location of a moving part of the control system directly in the viewfinder or have required a complex and expensive optical system for transmitting the signal into the viewfinder from a remotely located control system.

It is a primary object of the present invention to provide a simple inexpensive device for transmitting a low-light signal into the viewfinder of a camera from an automatic exposure control system that is located in the camera at a position remote from the viewfinder.

It is a further object of the invention to provide a unitary optical component in a camera for both illuminating a part of an automatic exposure control system in such camera and transmitting a reflected signal from such part rearwardly into the camera viewfinder when scene brightness is less than a predetermined value.

Other objects of the invention will appear from the following description, reference being made to the accompanying drawings, wherein:

FIG. 1 is a schematic right side view of the basic elements of a motion picture camera embodying one form of the present invention;

FIG. 2 is a front view of the exposure control and viewfinder mechanism illustrated in FIG. 1;

FIG. 3 is an enlarged top view of the optical component shown in FIGS. 1 and 2;

FIG. 4 is a front view of the optical component shown in FIG. 3;

FIG. 5 is a left side view of the optical component shown in FIGS. 3 and 4;

FIGS. 6, 7 and 8 are top, front and right side views, respectively, of an alternate form of optical component according to the invention; and FIGS. 9, 10 and 11 are top, front and right side views, respectively, of a third form of optical component according to the invention.

Referring to FIG. 1, a typical camera embodying the invention has a taking-lens axis 10 on which are arranged a diaphragm vane 12, a taking-lens system indicated generally at 14, a shutter 20 and a photosensitive surface such as a filmstrip 22. Referring also to FIG. 2 the diaphragm vane 12 may be supported on an arm 13 pivoted on a shaft 16 and may have a tapered, curved aperture 18, which moves in a path crossing the lens axis 10 for establishing an exposure aperture whose area is a function of the angular position of the vane. This vane may be positioned automatically, in a manner well known in the art, by means of a galvanometer coil 24, which is connected to and rotates the diaphragm shaft 16. Coil 24 constitutes the moving element of an electrical measuring instrument 26 and is connected by leads 28 and 30 to a photocell 32, which is exposed to scene light. Variations in scene brightness cause the coil 24 to be variably energized by photocell 32 and thereby cause the coil to move angularly about shaft 16 for establishing an angular position of the diaphragm vane 14 corresponding to scene brightness. The structure and operation of the measuring instrument 26 and photocell 32 are well known in the art and may be of the type disclosed in U.S. Patent 2,509,893, granted May 30, 1950, to C. F. Taylor et al.

Although the drawings illustrate a motion picture camera wherein the exposure is automatically controlled by positioning a diaphragm vane, it will be understood that the invention has equal utility in conjunction with other forms of automatic exposure control, e.g., in still or motion picture cameras wherein shutter speed is automatically controlled instead of or in addition to diaphragm opening.

If the scene brightness falls below the photographic range of the camera, the operator is apprised of this fact by means of a signal appearing in the camera viewfinder. An arm 34 moving with the instrument coil 24 and diaphragm vane 12 carries a reflecting member 36, which is angularly disposed relative to coil 24 such that when the coil moves the diaphragm vane 12 to its maximum aperture position, it moves member 36 into a substantially horizontal plane above coil 24. At this position the reflecting member 36 underlies a unitary optical component 42, which receives light from the exterior of the camera, directs it onto the upper surface of member 36, receives light reflected back from member 36 and directs the reflected light rearwardly into the camera viewfinder. The viewfinder is illustrated in a simple form having front and rear lenses 38 and 40, respectively.

Referring to FIGS. 3, 4 and 5, the optical component 42 may comprise a pair of cylindrical or spherical lenses 44 flanking a central prism 46 and surrounded by a flange 48. Light from above and in front of the camera (and from its sides if lenses 44 are spherical) is directed by lenses 44 and flange 48 downward into the camera and onto the upper surface of member 36. The latter surface reflects light back into the optical component 42 and for this purpose may be formed in any suitable manner, for example, as a flat or curved diffuser or a cupped mirror or any combination of diffusing and mirrored surface.

FIGS. 6, 7 and 8 illustrate a second form of optical component which may be employed for directing light onto member 36 (FIG. 1) and receiving light reflecting back from the latter member and transmitting the reflected light rearwardly in the viewfinder. In FIGS. 6, 7 and 8 the optical component comprises a prism 50 for reflecting light rearwardly in the viewfinder and a flange surrounding the prism for directing skylight downward into the camera. A similar configuration of optical component is shown in FIGS. 9, 10 and 11, wherein a central, rearwardly reflecting prism 56 is flanked by a pair of downwardly reflecting prisms 58 which receive light from the photographic scene and direct it downwardly toward the reflecting surface 36 (FIGS. 1 and 2). Light reflected upwardly by surface 36 is received by prism 56 (FIGS. 9, 10 and 11) and reflected rearwardly in the viewfinder. Prisms 56 and 58 are surrounded by a flange 60 which directs skylight downwardly into the camera toward surface 36 (FIGS. 1 and 2).

It will be apparent from the foregoing description of preferred embodiments of the invention that the combination of viewfinder, unitary optical component and control system reflector form an inexpensive but highly efficient signalling system. The unitary optical component, such as 42 in FIGS. 1-5, preferably is molded from plastic in a single operation but may be formed in any other suitable manner from plastic or optical glass, by processes well known in the art.

The invention has been described in detail with particular reference to preferred embodiments thereof, but it will be understood that variations and modifications can be effected within the spirit and scope of the invention as described hereinabove and as defined in the appended claims.

We claim:

1. In a camera having a housing, a viewfinder attached to the outside surface of said housing, a photoelectric device disposed for illumination by scene light, and a member moving within a predetermined range under control of said photoelectric device as a function of the illumination of said device and disposed inside of said housing at a position remote from said viewfinder, the combination comprising: a reflecting surface moving with said member in a predetermined path; and a unitary optical component mounted in an aperture communicating between the inside of said housing and said viewfinder, said component including means for directing light from said viewfinder toward the path of said reflecting surface as well as means for receiving said directed light back from said reflecting surface, when and only when said member is in a predetermined portion of said range, and for reflecting rearwardly in said viewfinder the light received back from said surface.

2. The combination defined in claim 1, wherein said unitary optical component comprises: at least one prism disposed for receiving light from said reflecting surface and for reflecting said light rearwardly in said viewfinder; and a flange surrounding said prism for directing skylight downwardly toward the path of said reflecting surface.

3. The combination defined in claim 1, wherein said unitary optical component comprises: at least one prism disposed for receiving light from the scene in front of said camera and reflecting said light downwardly toward the path of said reflecting surface; and at least one prism disposed for receiving light from said reflecting surface and reflecting the same rearwardly in said viewfinder.

4. The combination defined in claim 3, with a flange surrounding said prisms for directing skylight downwardly toward the path of said reflecting surface.

References Cited in the file of this patent

UNITED STATES PATENTS

| | | |
|---|---|---|
| 2,191,414 | Sauer | Feb. 20, 1920 |
| 2,197,194 | Sauer | Apr. 16, 1940 |
| 2,242,043 | Sanger | May 13, 1941 |

FOREIGN PATENTS

| | | |
|---|---|---|
| 466,923 | Great Britain | June 8, 1937 |
| 842,154 | Germany | June 23, 1952 |
| 1,036,629 | Germany | Aug. 14, 1958 |